United States Patent
Scrivano

(10) Patent No.: US 12,554,523 B2
(45) Date of Patent: Feb. 17, 2026

(54) REDUCING DEPLOYMENT TIME FOR CONTAINER CLONES IN COMPUTING ENVIRONMENTS

(71) Applicant: RED HAT, INC., Raleigh, NC (US)

(72) Inventor: Giuseppe Scrivano, Spezzano della Sila (IT)

(73) Assignee: Red Hat, LLC, Raleigh, NC (US)

( * ) Notice: Subject to any disclaimer, the term of this patent is extended or adjusted under 35 U.S.C. 154(b) by 812 days.

(21) Appl. No.: 17/837,306

(22) Filed: Jun. 10, 2022

(65) Prior Publication Data
US 2023/0401080 A1 Dec. 14, 2023

(51) Int. Cl.
*G06F 9/455* (2018.01)
*G06F 8/61* (2018.01)
*G06F 9/4401* (2018.01)

(52) U.S. Cl.
CPC ............ *G06F 9/45558* (2013.01); *G06F 8/63* (2013.01); *G06F 9/4401* (2013.01); *G06F 9/45508* (2013.01); *G06F 2009/45562* (2013.01); *G06F 2009/4557* (2013.01); *G06F 2009/45575* (2013.01)

(58) Field of Classification Search
CPC ...... G06F 9/45558; G06F 8/63; G06F 9/4401; G06F 9/45508; G06F 2009/45562; G06F 2009/4557; G06F 2009/45575; G06F 2009/45583
See application file for complete search history.

(56) References Cited

U.S. PATENT DOCUMENTS

| | | | |
|---|---|---|---|
| 10,248,336 B1* | 4/2019 | Koujalagi | G06F 3/0608 |
| 10,678,656 B2 | 6/2020 | Chavda et al. | |
| 2017/0235649 A1* | 8/2017 | Shah | G06F 11/1464 707/649 |

(Continued)

FOREIGN PATENT DOCUMENTS

CN 109271198 A * 1/2019

OTHER PUBLICATIONS

Zhang, CN109271198A Description Translation, Jan. 25, 2019, <https://worldwide.espacenet.com/publicationDetails/description?CC=CN&NR=109271198A&KC=A&FT=D&ND=3&date=20190125&DB=&locale=en_EP>, pp. 1-10 (Year: 2019).*

(Continued)

*Primary Examiner* — Aimee Li
*Assistant Examiner* — Hsing Chun Lin
(74) *Attorney, Agent, or Firm* — Kilpatrick Townsend & Stockton LLP

(57) ABSTRACT

Deployment times for container clones may be reduced by implementing some examples described herein. In one example, a system can receive a container snapshot including runtime data for a software service executed inside a container at a prior point in time. The system can deploy a template container from the container snapshot at least in part by assigning a memory region to the template container and loading the runtime data from container snapshot into the memory region. The system can freeze the template container to prevent modification of the runtime data in the memory region. While the template container is frozen, the system can deploy a container clone using the runtime data in the memory region, such that the container clone includes the software service in at least a substantially ready state by default based on the runtime data.

16 Claims, 9 Drawing Sheets

(56) References Cited

U.S. PATENT DOCUMENTS

| | | | |
|---|---|---|---|
| 2017/0322824 A1* | 11/2017 | Reuther | G06F 3/0632 |
| 2017/0323110 A1* | 11/2017 | Griffith | G06F 21/6245 |
| 2019/0095441 A1* | 3/2019 | Scrivano | G06F 16/51 |
| 2020/0201616 A1 | 6/2020 | Mueller | |
| 2020/0272427 A1* | 8/2020 | Wang | G06F 8/63 |
| 2021/0109778 A1* | 4/2021 | Keating | A63F 13/48 |
| 2021/0117308 A1 | 4/2021 | Burgos | |
| 2021/0240734 A1 | 8/2021 | Shah et al. | |
| 2021/0271499 A1 | 9/2021 | Fong et al. | |
| 2023/0014233 A1* | 1/2023 | Xiang | G06F 11/0757 |

OTHER PUBLICATIONS

Ahmed et al., "Docker Container Deployment in Distributed Fog Infrastructures with Checkpoint/Restart", IEEE International Conference on Mobile Cloud Computing; Apr. 2020; Oxford, UK, pp. 1-9.

Nadgowda, et al., "Comparing Scaling Methods for Linux Containers", IBM T.J. Watson Research, New York; pp. 1-7.

Shatrov, Kir, "Boosting application boot time with container snapshots", https://kirshatrov.com/posts/experimenting-with-criu-and-slow-boot; 2019; pp. 1-8.

Extended European Search Report of Application No. 22192325.3 dated May 22, 2023: pp. 1-9.

Venkatesh et al., "Fast in-memory CRIU for docker containers," Proceedings of the International Symposium on Memory Systems, Sep. 2019: pp. 53-65.

\* cited by examiner

REDUCING DEPLOYMENT TIME FOR CONTAINER CLONES IN COMPUTING ENVIRONMENTS

TECHNICAL FIELD

The present disclosure relates generally to deploying containers in computing environments. More specifically, but not by way of limitation, this disclosure relates to reducing deployment time for container clones in computing environments.

BACKGROUND

Software services such as applications, serverless functions, and microservices can be deployed inside containers within a computing environment. A container is a relatively isolated virtual environment created by leveraging the resource isolation features (e.g., cgroups and namespaces) of the Linux Kernel. Deploying software services inside containers can help isolate the software services from one another, which can improve speed and security and provide other benefits.

Containers are deployed from image files using a container engine, such as Docker®. These image files are often referred to as container images. A container image can be conceptualized as a stacked arrangement of layers in which a base layer is positioned at the bottom and other layers are positioned above the base layer. The base layer may include operating system files for deploying a guest operating system inside the container. The guest operating system may be different from the underlying host operating system of the physical machine on which the container is deployed. The other layers may include a target software service and its dependencies, such as its libraries, binaries, and configuration files. The target software service may be configured to run (e.g., on the guest operating system) within the isolated context of the container. At runtime, the target software service may generate runtime data that is stored in a memory area that is distinct from the container image, which is generally immutable. Such runtime data can include environment variable values and other data, which may be generated after the container is initialized for the purpose of executing the target software service.

DETAILED DESCRIPTION

Figure 1:
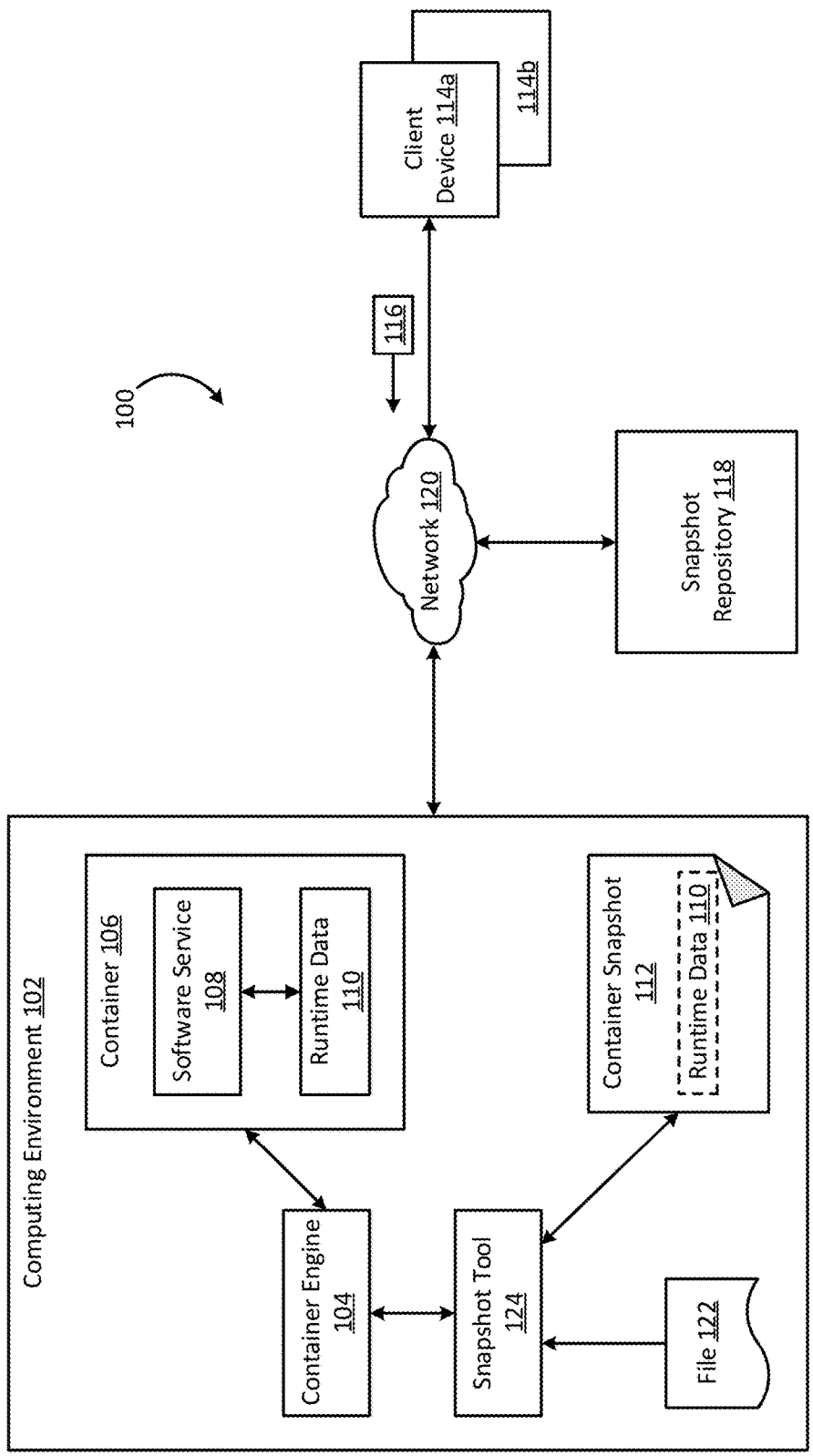
FIG. 1 is a block diagram of an example of a system for generating a container snapshot according to some aspects of the present disclosure.

Containers can be deployed in computing environments for various purposes, for example to service client requests. Different containers may include different types of software services that perform different types of functionality. For example, one container may include a webserver while another container may include a load balancer. Although creating a container can be very fast, the startup process for the software service inside the container can be arbitrarily long. The same software service may take a variable amount of time to startup based on a wide variety of factors, such as the hardware and software characteristics of the physical machine on which it is being deployed. For example, a web server may take much longer to start up in one container than in another container. Because a container may be unable to perform useful operations until its software service is ready (e.g., has finished starting up), the amount of time it takes to start up the software service can be a bottleneck in the container deployment process. This bottleneck can introduce latency into the system that negatively impacts performance. And because the bottleneck that is highly variable, it can be challenging to predict and account for the bottleneck in a preemptive way.

Some examples of the present disclosure can overcome one or more of the abovementioned problems by helping to reduce and standardize the deployment time for containers in a computing environment. This can be achieved using two techniques described herein. A first technique involves using container snapshots to expedite deployment time. A container snapshot is a snapshot of a container at a given point in time. To create the container snapshot, a system can deploy the container in a computing environment. The container can include a software service. The software service may undergo a startup process and ultimately enter into a ready state once it has completed the startup process. After the software service enters the ready state, but before it is actually used to perform tasks, the system can generate a snapshot of the container. The container snapshot can store the runtime environment for the software service within the container at that point in time. For example, the container snapshot can store runtime data generated for the software service as a result of the startup process. Because the container snapshot is generated after the startup process is finished and before the software service is actually used to perform tasks, the container snapshot may be considered a "pure" version of the container in which the software service is ready for use. After the container snapshot is created, it can then be subsequently used to quickly and easily deploy clones (copies) of the original container. Because the software service is already in a ready state in the container snapshot, the software service will also be in at least a substantially ready state by default in the container clones. As a result, the software service's startup process may be at least partially skipped when deploying the container clones, which may significantly reduce and standardize their deployment time.

A second technique described herein involves a way to expedite deployment of the container clones from the container snapshot. In particular, a system can receive a container snapshot and deploy a container clone from the container snapshot that has the software service in at least a substantially ready state by default. Part of the process of deploying the container clone can involving loading the runtime data from the container snapshot into a memory region. The memory region can be in a volatile memory, such as RAM or cache memory. After deploying the container clone, the system can freeze the container. Freezing a container can involve freezing some or all of the running processes inside the container to pause or stop their execution. By freezing the container clone, the runtime data stored in the memory region can be considered locked in the sense that it cannot be modified by the container clone. This can allow for the container clone to serve as a template (e.g., a base) from which additional container clones can be deployed. Because the container clone can serve as a template in this way, it can be referred to as a template container. One or more additional container clones can then be deployed using the runtime data already stored in the memory region, without having to separately reload the runtime data from the container snapshot into additional memory regions assigned to the additional container clones. This can reduce the deployment time for the additional container clones and improve memory efficiency, for example by preventing duplicate copies of the runtime data from being stored in memory. And by using the pre-generated runtime data, the software service can be deployed within the additional container clones in at least a substantially ready state by default, without having to repeat the entire startup process.

In some examples, the second process described above may be modified and implemented using a container that has a software service in the ready state, rather than using a container snapshot. For example, a system can deploy the container in a computing environment. The container can include a software service that may undergo a startup process and ultimately enter into a ready state. The software service may generate runtime data as a result of the startup process. After the software service enters the ready state, and before it is actually used to perform client tasks, the system can freeze the container. By freezing the container, the runtime data can be considered locked, in the sense that it cannot be further modified by processes in the container. This can allow for the container to serve as a template for container clones. Because the container can serve as a template in this way, it can be considered a template container. One or more container clones can then be deployed using the locked runtime data, without having to repeat the software service's startup process each time.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for generating a container snapshot 112 according to some aspects of the present disclosure. The system 100 includes a computing environment 102, which may or may not be a distributed computing environment. Examples of a distributed computing environment can include a cloud computing environment, a computing cluster, or a data grid. If the computing environment 102 is a distributed computing environment, the computing environment 102 may include multiple nodes (e.g., virtual or physical machines) in communication with one another via one or more networks, such as a local area network internal to the computing environment 102.

The computing environment 102 may be configured to perform various tasks using containers. For example, the computing environment 102 can receive requests 116 from client devices 114a-b via one or more networks 120, such as the Internet. Examples of the client devices 114a-b can include laptop computers, desktop computers, mobile phones, tablets, or wearable devices. The requests 116 can be for performing one or more client tasks. The computing environment 102 can service such requests 116 by using software services executing inside containers. For example, client device 114a may issue a request 116 to process a dataset to the computing environment 102 via the one or more networks 120. The computing environment 102 can receive the request 116, process the dataset using a data processing application executing inside a container, and provide a processing result back to the client device 114. In this example, the client task can be the data processing task and the software service 108 can be the data processing application. Of course, it will be appreciated that the computing environment 102 can include any number and combination of containers for use in performing any number and combination of client tasks. The computing environment can deploy the containers using a container engine 104, such as Docker®.

In some cases, a container may not be deployed in the computing environment 102 until the container is needed, for example to service a request 116 from a client device 114a. Waiting to deploy containers until they are needed can have a variety of advantages, such as reducing the total number of unused containers executing in the computing environment 102, and thereby reducing the resource consumption associated therewith. But waiting to deploy containers can also have disadvantages. For example, because a container may not be deployed until it is needed, the startup times associated with the container and its software service can introduce latency in servicing a client request 116. In a typical scenario, this latency may be highly variable, particularly the portion of the latency resulting from starting up the software service. But some examples of the present disclosure can help reduce this latency and make it more consistent by using container snapshots.

More specifically, the container engine 104 can deploy a container 106 in the computing environment 102. Deploying the container 106 may involve performing a bootup phase for the container. The bootup phase can involve assigning a memory region to the container 106. The memory region can serve as a writable layer for storing data generated or received by a software service 108 within the container 106. The bootup phase can also involve connecting to a computer network, connecting to networked resources (e.g., storage devices and databases accessible via the network) outside the container 106, etc. In some examples, the container engine 104 can detect when the bootup phase for the container 106 is complete. For example, the container engine 104 may make this determination based on a communication from the container 106 informing the container engine 104 that the container 106 is in a ready state.

Deploying the container 106 may also involve performing a startup process for a software service 108 inside the container 106. The startup process may involve parsing code, generating or setting environment variables, loading configuration data into memory, generating additional files, gathering namespace data such as a universally unique identifier (UUID) assigned to the software service 108, and performing other startup operations to make the software service 108 functional within the context of the container 106. This information, which is generated or collected during the startup phase of the software service 108, can be referred to as runtime data 110. In some examples, the container engine 104 can detect when the startup process for the software service 108 is complete. For example, the container engine 104 may make this determination based on a communication from the container 106 informing the container engine 104 that the software service 108 is in a ready state.

After determining that the software service 108 is in a ready state (e.g., that the startup process is complete), the container engine 104 can interact with a snapshot tool 124 to generate a snapshot 112 of the container 106. For example, the container engine 104 can transmit a command to the snapshot tool 124 to generate the container snapshot 112. One example of the snapshot tool 124 can be Checkpoint/Restore in Userspace (CRIU), which can freeze a running container and checkpoint its state to disk. The saved state data can be used to restore the container and run it like it was as of the time of the freeze. While CRIU is more commonly used to create container backups (e.g., backup checkpoints in case a container fails), some examples described herein may leverage this functionality to create the container snapshot 112.

The container snapshot 112 can include the runtime data 110 generated based on the startup process for the software service 108. Because the container snapshot 112 includes the runtime data 110, subsequent container clones deployed using the container snapshot 112 will also include the runtime data 110 for the software service 108. This can allow the container clones to skip the startup process, which can significantly expedite the startup process.

In some examples, the container engine 104 can trigger the snapshot tool 124 to generate the container snapshot 112 at a particular point in time. That particular point in time can be after the software service 108 has completed its startup process (and after the container 106 has completed its boot phase), but before the software service 108 is used to perform client tasks. A client task can be a task that is requested by a client external to the container 106. For example, the computing environment 102 can receive a request 116 from a client device 114*a* to perform a task using the software service 108. If the container 106 is not already deployed, the computing environment 102 can automatically deploy the container 106 in response to receiving the request 116. Deploying the container 106 may involve executing the bootup phase for the container 106 and the startup process for the software service 108. Once the startup process is complete, but before servicing the client request 116, the snapshot tool 124 can generate the container snapshot 112. As a result, the container snapshot 112 may have a "pure" version of the runtime data 110. After generating the container snapshot 112, the computing environment 102 may then use the software service 108 to service the request 116. Servicing the request 116 may involve the software service 108 performing computations or making other changes to the container 106 or the runtime data 110. But because the container snapshot 112 was taken prior to those changes being made, those changes would be excluded from the container snapshot 112.

In some example, the runtime data 110 may include sensitive information, context-specific information, or other information that it may be desirable to exclude from the container snapshot 112. For example, the runtime data 110 may include environment variable values (e.g., a UUID) that are unique to the computing environment 102. Incorporating this context-specific information into the container snapshot 112 may lead to execution problems and other errors in relation to container clones deployed in other contexts, such as other computing environments. As another example, the runtime data 110 may include sensitive information, such as usernames, passwords, account numbers, encryption or decryption keys, secrets, or any combination of these. Incorporating the sensitive information into the container snapshot 112 may raise security risks. In some examples, it is possible to exclude such information from the container snapshot 112. For example, such information may be identified for exclusion in a file 122. The file 122 may be created by a developer associated with the container 106 or another entity. The snapshot tool 124 can access the file 122 to determine one or more portions of the runtime data 110 to exclude from the container snapshot 112. The snapshot tool 124 can then exclude those portions when generating the container snapshot 112.

The file 122 may be any suitable type of file. For example, the file 122 may be a container image used to deploy the container 106 in the computing environment 102. In some such examples, the container image may include metadata that has exclusion data indicating one or more portions of the runtime data 110 to be excluded from the container snapshot 112. Because it is part of the container image's metadata, the exclusion data can easily travel with the container image between computing environments.

Once created, the container snapshot 112 can be saved in a snapshot repository 118, which may store any number and combination of container snapshots. Users can access the snapshot repository 118 to download the container snapshot 112 and use it to deploy clones of the container 106 in their computing environments (which may be different from the computing environment 102). For example, client device 114*b* can download the container snapshot 112 from the snapshot repository 118 and use it to deploy a clone of the container 106 thereon.

Figure 2:
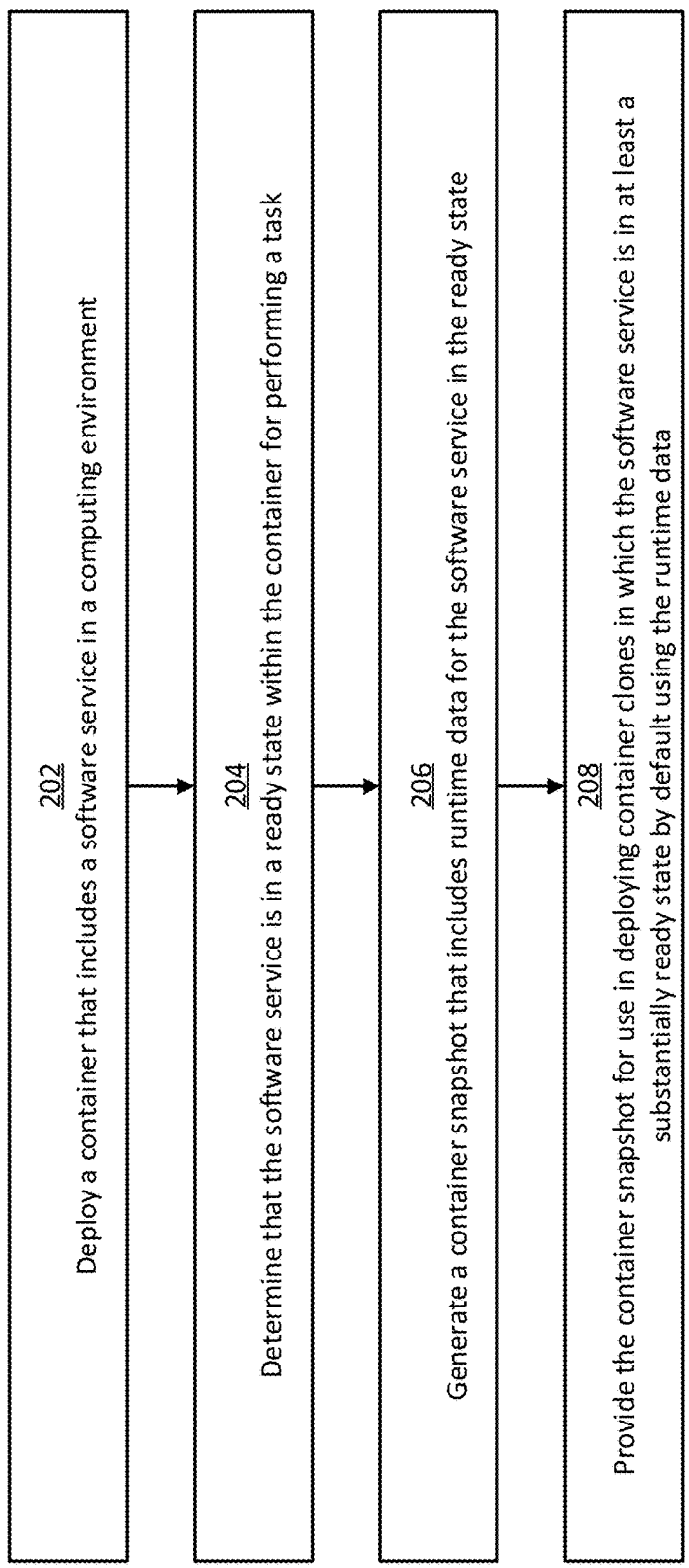
FIG. 2 is a flow chart of an example of a process for generating a container snapshot according to some aspects of the present disclosure.

One example of the above process for generating a container snapshot 112 is shown in FIG. 2. The process can be implemented by a processor of the computing environment 102. The process will now be described below with reference to the components of FIG. 1 described above.

In block 202, a processor deploys a container 106 that includes a software service 108 in a computing environment 102. For example, the processor can execute a container engine 104 to deploy the container 106.

In block 204, the processor determines that the software service 108 is in a ready state within the container 106 for performing a task (e.g., a client task). The software service 108 can enter the ready state once a startup process for the software service 108 is complete. In some examples, the processor can determine that the software service 108 is in the ready state by communicating with a container engine 104 associated with the container 106, or by communicating with the container 106 or the software service 108 (and thereby excluding the container engine 104 as an intermediary).

In block 206, the processor generates a container snapshot 112 that includes runtime data 110 for the software service 108 in the ready state. For example, the processor can execute a snapshot tool 124, such as CRIU, to generate the container snapshot 112. In some examples, the processor can generate the container snapshot 112 at a particular point in time that is subsequent to a completion of the startup process for the software service 108 and prior to the software service 108 performing any client tasks.

In block 208, the processor provides the container snapshot 112 for use in deploying container clones. In the container clones, the software service 108 can be in at least a substantially ready state by default based on the runtime data 110. In one example, the processor can provide the container snapshot 112 by storing the container snapshot 112 in a snapshot repository, or in another type of data store, from which the container snapshot 112 can be retrieved and used to deploy clones of the container 106.

If a portion of the runtime data 110 is excluded from the container snapshot 112 (e.g., based on the exclusionary data in the file 122), the instance of the software service deployed in the container clone may not be in a fully ready state by default. This is because some of the excluded information may be necessary for the instance to function properly. Instead, the instance may be considered to be in a substantially ready state in which the instance is configured using a majority of the runtime data 110. For example, the instance can be considered in a substantially ready state if the instance was configured using a majority of the runtime data 110 and only the intentionally excluded pieces of runtime data 110 are needed to transition to the ready state. As one particular example, the instance of the software service in the container clone may need a UUID to function properly. But the UUID for the software service 108 may have been intentionally excluded from the container snapshot 112, for example because that information can be very context specific. Because the required UUID is missing, the instance can be considered in a substantially ready state. If the instance of the software service is in a substantially ready state, the instance can determine which of the runtime data 110 is missing and generate or obtain the missing information. This can transition the instance from the substantially ready state to the ready state.

Figure 3:
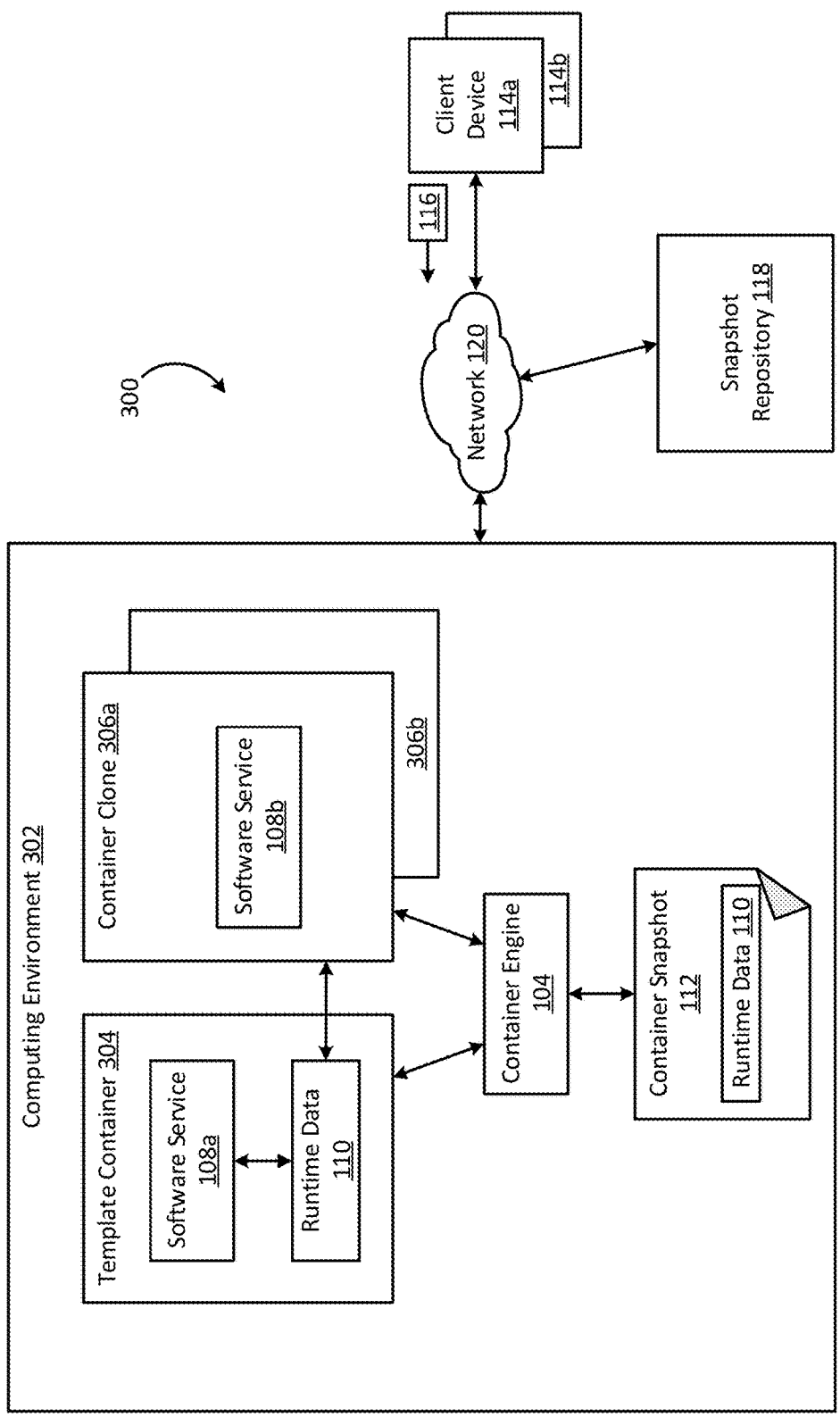
FIG. 3 is a block diagram of an example of a system for deploying container clones from a container snapshot according to some aspects of the present disclosure.

One example of a system 300 for deploying container clones from a container snapshot 112 is shown in FIG. 3. As shown, the system 300 can include a computing environment 302, which may or may not be a distributed computing environment. If the computing environment 302 is a distributed computing environment, the computing environment 302 may include multiple nodes in communication with one another via one or more networks, such as a local area network internal to the computing environment 302. The computing environment 302 may be configured to perform various tasks using containers, similar to the computing environment 102 of FIG. 1. For example, the computing environment 302 can service requests 116 from client devices 114a-b using software services executing within containers. The computing environment 302 can use a container engine 104 to deploy any number and combination of containers for use in performing any number and combination of client tasks.

In some cases, a container may not be deployed in the computing environment 302 until the container is needed, for example to service a request 116 from a client device 114a. Waiting to deploy containers until they are needed can introduce latency and have other disadvantages, as described above. But some examples of the present disclosure can leverage the container snapshots created using the above process to help reduce this latency and make it more consistent.

For example, the computing environment 302 can receive a container snapshot 112 from a snapshot repository 118 or another source. The container snapshot 112 can include runtime data 110 generated for a software service 108 that was previously executed inside a container at a prior point in time. Using the container snapshot, the computing environment 302 can deploy a template container 304. For example, the container engine 104 can ingest the container snapshot 112 and use it to deploy the template container 304. A template container is a container from which other container clones may be spawned, as described below. Deploying the template container 304 may involve implementing a bootup phase for the template container 304. The bootup phase may involve assigning a memory region to the template container 304 and loading the runtime data 110 from container snapshot 112 into the memory region. The memory region can be located in a volatile memory device (e.g., RAM or a cache memory), or a nonvolatile memory device, of the computing environment 302.

After loading the runtime data 110 into the memory region, the computing environment 302 can freeze the template container 304. For example, the container engine 104 can freeze the template container 304. This can prevent the processes inside the template container 304 from modifying the runtime data 110 loaded into the memory region. To freeze the template container 304, the computing environment 302 can issue one or more commands. For example, the container engine 104 can issue the "lxc-freeze" command or the Docker "pause" command, which suspends all processes running inside a container.

While the template container 304 is frozen, the container engine 104 then deploy one or more container clones 306a-b using the container snapshot 112 and the runtime data 110 stored in the memory region. For example, the container clone 306a can be deployed using the runtime data 110 stored in the memory region. This may involve configuring the container clone 306a (e.g., during its bootup phase) to point to the runtime data 110 in the memory region. This can allow the container clone 306a to make use of the existing runtime data 110 already present in memory, without having to load another copy of the runtime data 110 into memory from the container snapshot 112. This can expedite the speed in which the container clone 306a is deployed and prevent memory waste. And by using the runtime data 110, the software service 108b in the container clone 306a can be deployed in at least a substantially ready state by default, without having to undergo a full startup process. Using these techniques, any number of container clones 306a-b can be deployed from the template container 304 in a fast and efficient manner.

Figure 4:
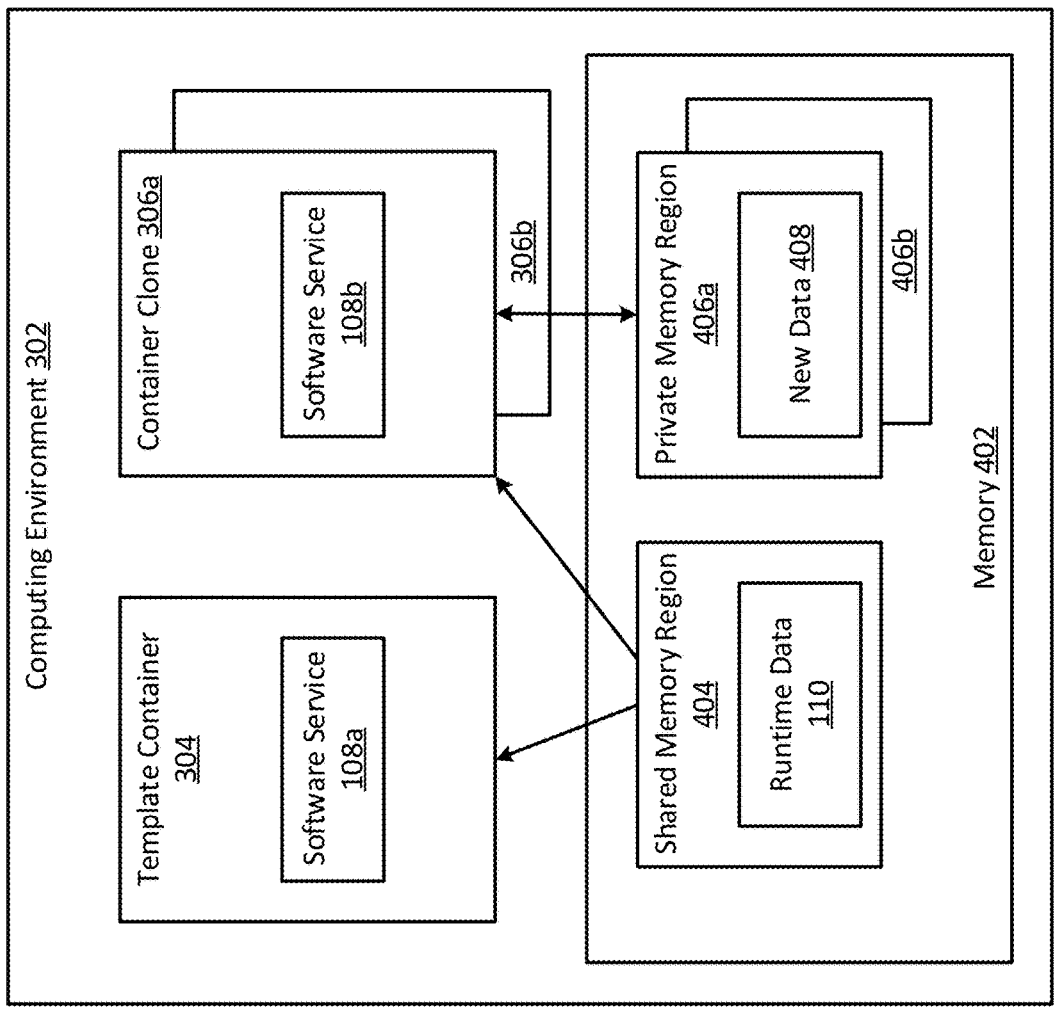
FIG. 4 is a block diagram of an example of a system for sharing runtime data for a software service according to some aspects of the present disclosure.

FIG. 4 shows an example of the memory region described above. In this example, the computing environment 302 has deployed a template container 304. Part of that deployment process can involve assigning a memory region to the template container 304. The memory region can be located inside a memory 402, such as a volatile or nonvolatile memory. The runtime data 110 can then be loaded into the memory region from the container snapshot 112. This memory region can be considered a shared memory region 404, because it can also be accessed by one or more container clones 306a-b so that the container clones 306a-b can also use the runtime data 110. The container clones 306a-b may each also have their own private memory regions 406a-b assigned thereto by the computing environment 302. The private memory regions 406a-b can be designated for storing new data 408 generated or received during the lifecycles of the container clones 108a-b. Each of the private memory regions 406a-b may be unique to its corresponding container clone, in the sense that it is inaccessible to the template container 304 and the other container clones. For example, the private memory region 406a can be unique to container clone 306a, such that private memory region 406a is inaccessible to the template container 304 and the other container clone 306b.

Figure 5:
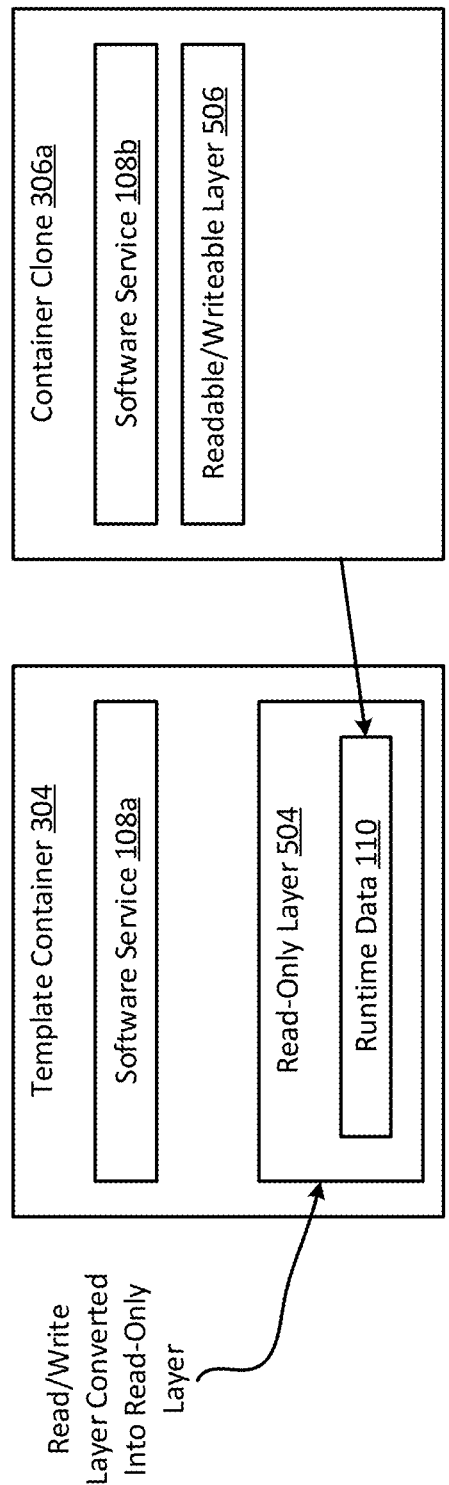
FIG. 5 is a block diagram of an example of a layered architecture according to some aspects of the present disclosure.

In some examples, the private memory regions 406a-b can correspond to the writeable layers in a container's layered architecture. One example of this layered architecture is shown in FIG. 5. Referring now to FIGS. 4-5 together, prior to being frozen, the template container 304 may be conceptualized as having a readable/writable layer in which the runtime data 110 is stored. Because the layer is writeable, the template container 304 has the capability to modify the runtime data 110. Since such modification may be undesirable, the template container 304 can be frozen. Freezing the template container 304 can effectively convert the readable/writable layer into a read-only layer 504, because the template container's processes can no longer write to the layer. At this point, the template container 304 can be conceptualized as having a read-only layer 504 storing the runtime data 110, as shown in FIG. 5. The read-only layer 504 can correspond to the shared memory region 404 of FIG. 4.

As described above, a container clone 306a may also be deployed based on the runtime data 110 in the read-only layer 504 of the template container 304. For example, the container clone 306a can be configured to point to the read-only layer 504, so that the software service 108b within the container clone 306a can make use of the runtime data 110 to avoid executing a complete startup process. The container clone 306a may also have its own readable/writeable layer 506 corresponding to the private memory region 406a of FIG. 4, in which the container clone 306a can store new data 408 that is unique to the container clone 306a.

Figure 6:
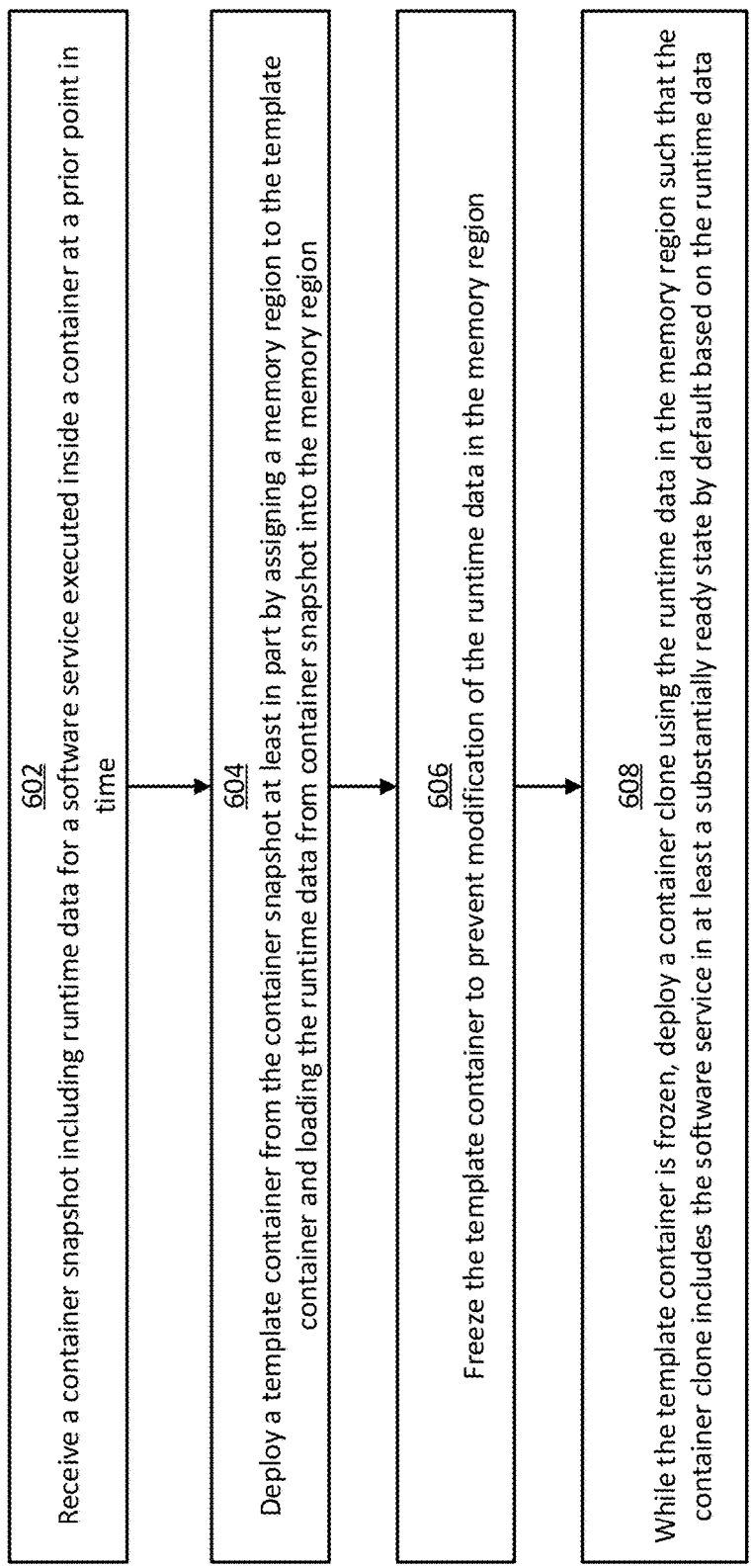
FIG. 6 is a flow chart of an example of a process for deploying container clones according to some aspects of the present disclosure.

FIG. 6 is a flow chart of an example of a process for deploying container clones according to some aspects of the present disclosure. The process can be implemented by a processor of the computing environment 302. The process will now be described below with reference to the components of FIGS. 1 and 3-4 described above.

In block 602, a processor receives a container snapshot 112 including runtime data 110 for a software service 108 executed inside a container 106 at a prior point in time. Receiving the container snapshot 112 can involve downloading the container snapshot 112 from a snapshot repository 118 or generating the container snapshot 112, for example using the techniques described above.

In block 604, the processor deploys a template container 304 from the container snapshot 112. Deploying the template container 304 can involve the processor assigning a memory region (e.g., shared memory region 404) to the template container 304. Deploying the template container 304 can also involve the processor loading a copy of the runtime data 110 from the container snapshot 112 into the memory region. Deploying the template container 304 can further involve performing other aspects of a bootup phase for the template container 304.

In block 606, the processor freezes the template container 304 to prevent the copy of the runtime data 110 in the memory region from being modified. For example, the processor can issue a "lxc-freeze" command or the Docker "pause" command to freeze the template container 304.

In block 608, the processor deploys a container clone 306a using the copy of the runtime data 110 in the memory region, while the template container 304 is frozen. By deploying the container clone 306a using the copy of the runtime data 110 loaded into the memory region, the copy of the software service 108b running inside the container clone 306a may be deployed in at least a substantially ready state by default.

Figure 7:
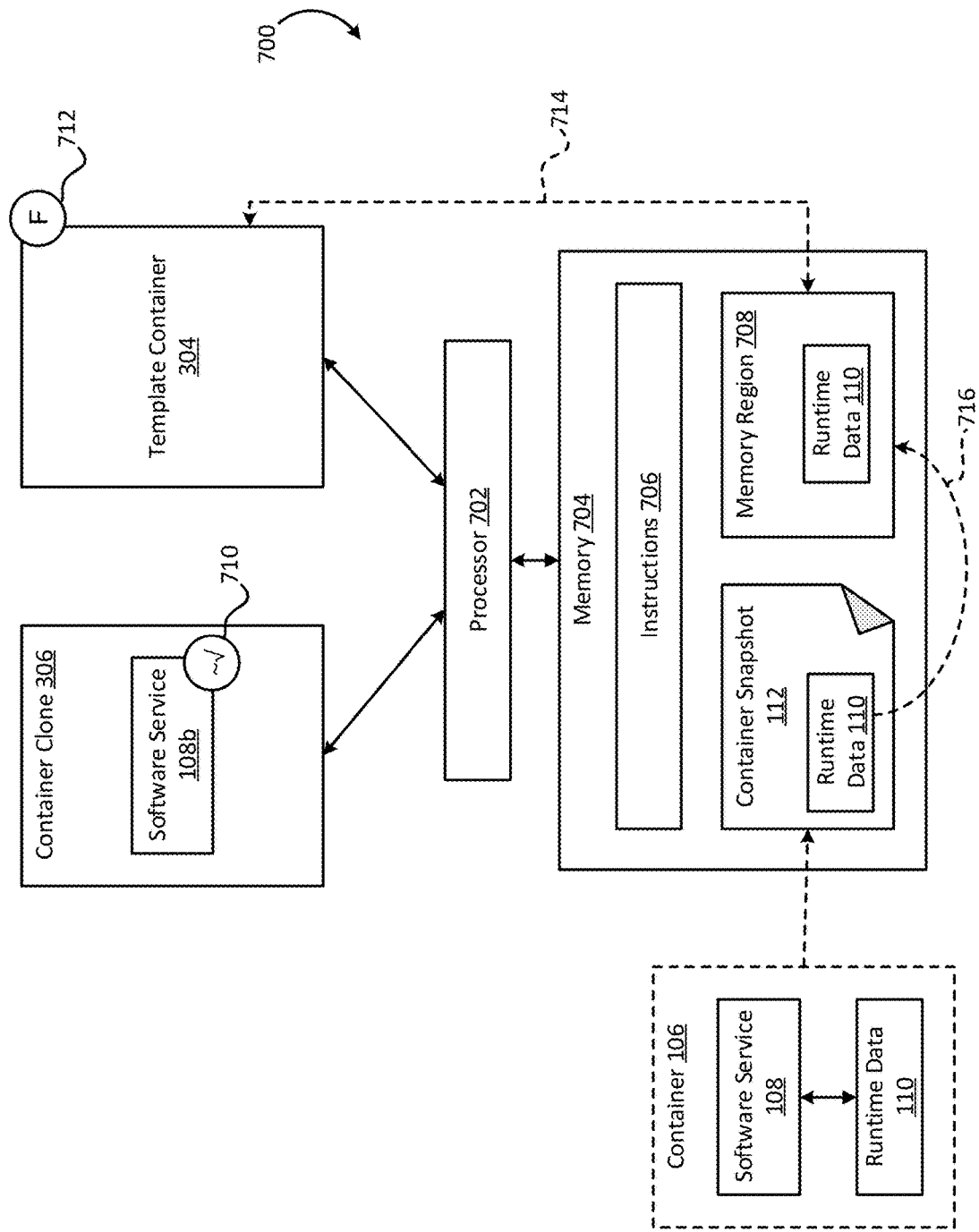
FIG. 7 is a block diagram of an example of a system for reducing deployment time for container clones according to some aspects of the present disclosure.

FIG. 7 is a block diagram of an example of a system 700 for reducing deployment time for container clones according to some aspects of the present disclosure. The system 700 includes a processor 702 communicatively coupled to a memory 704. The processor 702 and the memory 704 may be parts of a single computing device (e.g., within the same housing) or may be distributed from one another. In some examples in which the processor 702 and memory 704 are distributed from one another, they may be in communication via a network.

The processor 702 can include one processing device or multiple processing devices. Non-limiting examples of the processor 702 include a Field-Programmable Gate Array (FPGA) or an application-specific integrated circuit (ASIC), a microprocessor. The processor 702 can execute instructions 706 stored in the memory 704 to perform operations. In some examples, the instructions 706 can include processor-specific instructions generated by a compiler or an interpreter from code written in any suitable computer-programming language, such as C, C++, C#, and Java.

Memory 704 can include one memory device or multiple memory devices. The memory 704 can be non-volatile and may include any type of memory device that retains stored information when powered off. Non-limiting examples of the memory 704 include electrically erasable and programmable read-only memory (EEPROM), flash memory, or any other type of non-volatile memory. At least some of the memory 704 can include a non-transitory computer-readable medium from which the processor 702 can read instructions 706. A computer-readable medium can include electronic, optical, magnetic, or other storage devices capable of providing the processor 702 with computer-readable instructions 706 or other program code. Examples of a computer-readable medium can include magnetic disks, memory chips, ROM, random-access memory RAM, an ASIC, a configured processor, optical storage, or any other medium from which a computer processor can read instructions 706.

In some examples, the processor 702 can execute the instructions 706 to perform operations. For example, the processor 702 can receive a container snapshot 112 including runtime data 110 for a software service 108 executed inside a container 106 at a prior point in time. The processor 702 can deploy a template container 304 from the container snapshot 112 at least in part by assigning 714 a memory region 708 to the template container 304 and loading 716 a copy of the runtime data 110 from container snapshot 112 into the memory region 708. The processor 702 can next freeze the template container 304 to prevent modification of the runtime data 110 in the memory region 708. Freezing the template container 304 is represented in FIG. 7 by the freeze indicator 712. While the template container 304 is frozen, the processor 702 can deploy a container clone 306 using the copy of the runtime data 110 in the memory region 708, such that the container clone 306 includes the software service 108b in at least a substantially ready state by default based on the runtime data 110. The substantially ready state is represented in FIG. 7 by the state indicator 710.

Figure 8:
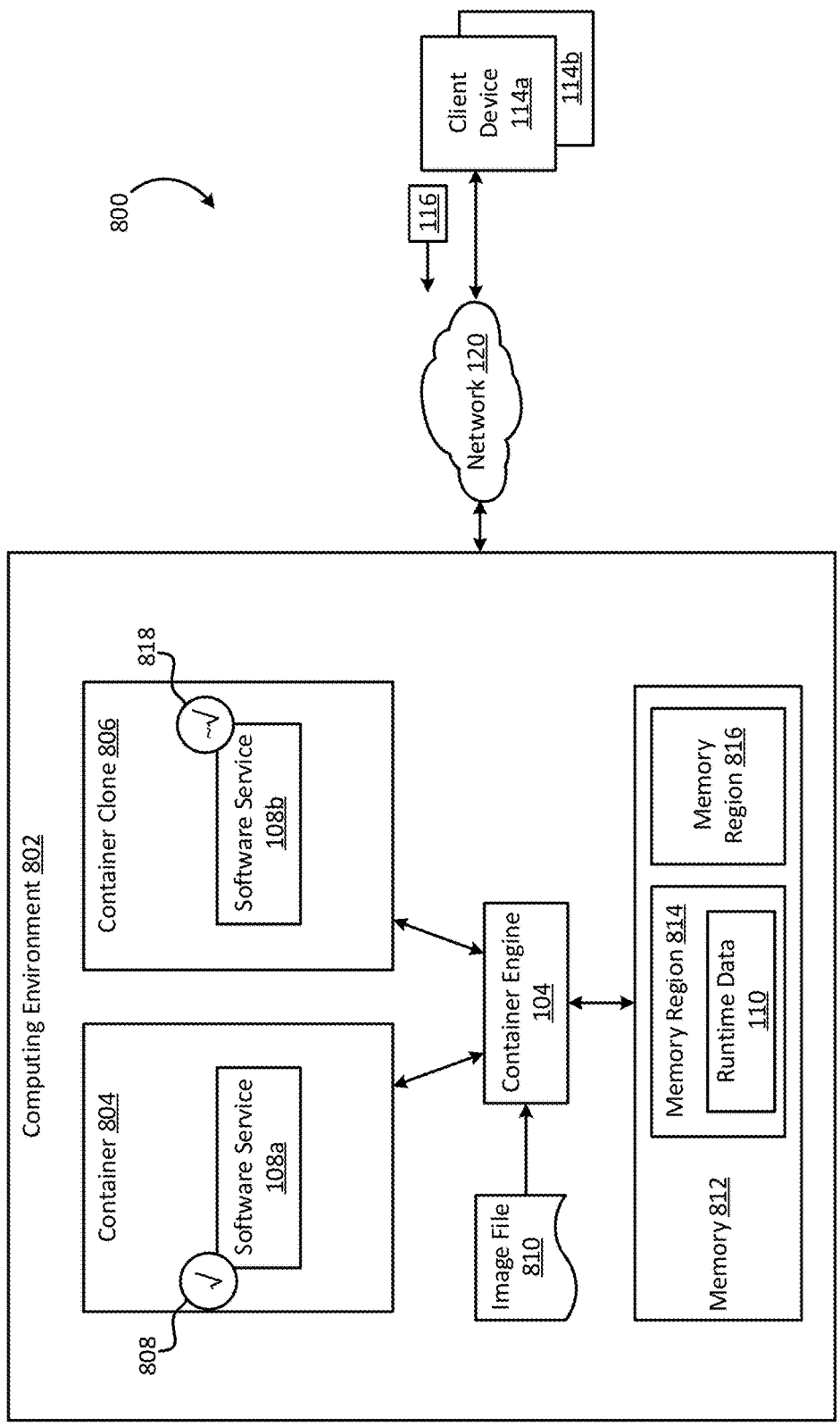
FIG. 8 is a block diagram of an example of a system for deploying a container clone from a container according to some aspects of the present disclosure.

In some examples, the clone-deployment process described above may be modified and implemented using a container that has a software service in the ready state, rather than using a container snapshot. One example of this is shown in FIG. 8. Referring now to FIG. 8, shown is a system 800 that includes a computing environment 802, which may or may not be a distributed computing environment. If the computing environment 802 is a distributed computing environment, the computing environment 802 may include multiple nodes in communication with one another via one or more networks, such as a local area network internal to the computing environment 802. The computing environment 802 may be configured to perform various tasks using containers, similar to the computing environments 102, 302 describe above. For example, the computing environment 302 can service requests 116 from client devices 114a-b using software services executing within containers. The computing environment 802 can use a container engine 104 to deploy any number and combination of containers for use in performing any number and combination of client tasks.

In some examples, the computing environment 802 can deploy a container 804 from an image file 810. For example, the container engine 104 can ingest the image file 810 and use it to deploy the container 804. Deploying the container 804 may involve implementing a bootup phase for the container 804. The bootup phase may involve assigning a memory region 814 to the container 804. The memory region can be located in a memory 812 (e.g., a volatile memory device or a nonvolatile memory device) of the computing environment 802. Deploying the container 804 may also involve executing a startup process for a software service 108a inside the container 804. As a result of executing the startup process, runtime data 110 may be generated and stored in the memory region 814 assigned to the container 804. Once the startup process is complete, the software service 108a may be in a ready state. The ready state is represented in FIG. 8 by the state indicator 808.

After storing the runtime data 110 in the memory region 814, the computing environment 802 can freeze the container 804. For example, the container engine 104 can freeze the container 804. This can prevent the processes inside the container 804 from modifying the runtime data 110 stored in the memory region 814. To freeze the container 804, the computing environment 802 can issue one or more commands, such as the "lxc-freeze" command or the Docker "pause" command.

While the container 804 is frozen, it can serve as a template container. For example, the container engine 104 can deploy one or more container clones 806 using the runtime data 110 stored in the memory region 814. This may involve configuring the container clone 806 (e.g., during its bootup phase) to point to the runtime data 110 in the memory region 814, which can serve as a shared memory region. This can allow the container clone 806 to make use of the existing runtime data 110 already present in memory, without having to copy the runtime data 110 into another memory region 816 (e.g., a private memory region) assigned to the container clone 806. This can expedite the speed in which the container clone 806 is deployed and prevent memory waste. And by using the runtime data 110, the software service 108b in the container clone 806 can be deployed in at least a substantially ready state by default, without having to undergo a full startup process. The substantially ready state is represented in FIG. 8 by the state indicator 818. Using these techniques, any number of container clones can be deployed in a fast and efficient manner.

Figure 9:
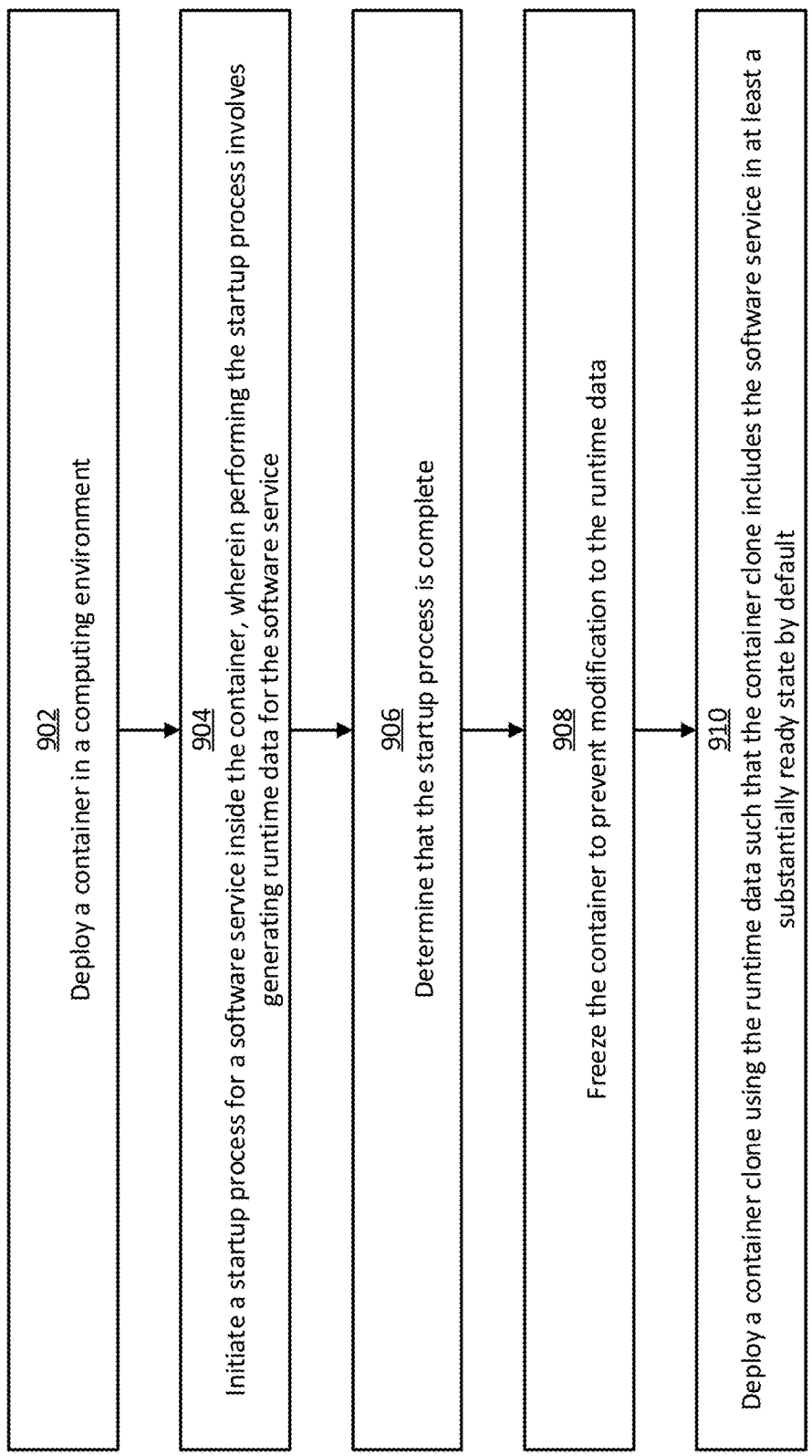
FIG. 9 is a flow chart of an example of a process for deploying a container clone from a container according to some aspects of the present disclosure.

One example of the above deployment process is shown in FIG. 9. The deployment process can be implemented by a processor of the computing environment 802. As used herein, "a processor" may include one or more processing devices, such as any of the processing devices described above. The deployment process will now be described below with reference to the components of FIG. 8 described above.

In block 902, a processor deploys a container 804 in a computing environment 802. For example, the processor can execute a container engine 104 to deploy the container 804 in the computing environment 802. As another example, the processor can transmit a command to the container engine 104, which may be located on another computing device, to cause the container 804 to be deployed in the computing environment 802. The container 804 can be deployed from an image file 810, which may have been previously built by a developer.

In block 904, the processor initiates a startup process for a software service 108a inside the container 804. For example, deploying the container 804 from the image file 810 may automatically trigger the startup process. During the startup process, runtime data 110 may be generated for the software service 108a.

In block 906, the processor determines that the startup process is complete. For example, the processor can make this determination based on a communication from the container 804 indicating that the software service 108a is in a ready state. As another example, the processor can make this determination based on a communication from the software service 108a indicating that the software service 108a is in a ready state.

In block 908, the processor freezes the container 804 to prevent modification to the runtime data 110. The processor can freeze the container 804 in response to determining that the startup process is complete. The processor may freeze the container 804 by issuing one or more commands to an operating system (e.g., a Linux kernel), to the container engine 104, or to another recipient.

In block 910, the processor deploys a container clone 806 using the runtime data 110, such that the container clone 806 includes the software service 108b in at least a substantially ready state by default. By reusing the runtime data 110 already stored in memory 812 to deploy the software service 108b, the software service 108b can be deployed more rapidly than may otherwise be possible.

In some aspects, deployment time for container clones can be reduced according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by a processor for causing the processor to: receive a container snapshot including runtime data for a software service executed inside a container at a prior point in time; deploy a template container from the container snapshot at least in part by assigning a memory region to the template container and loading the runtime data from container snapshot into the memory region; freeze the template container to prevent modification of the runtime data in the memory region; and while the template container is frozen, deploy a container clone using the runtime data in the memory region such that the container clone includes the software service in at least a substantially ready state by default based on the runtime data.

Example #2: The non-transitory computer-readable medium of Example #1, wherein the container clone is configured to use the memory region as an immutable layer from which to retrieve the runtime data, and wherein the container clone is configured to store other data in a writeable layer that is separate from the immutable layer and private to the container clone.

Example #3: The non-transitory computer-readable medium of any of Examples #1-2, wherein the memory region is a first memory region, and further comprising program code that is executable by the processor for causing the processor to deploy the container clone at least in part by: assigning a second memory region to the container clone for use in storing data generated by the software service during a runtime of the container clone; and configuring the container clone using the runtime data stored in the first memory region, without reloading the runtime data from the container snapshot into the second memory region.

Example #4: The non-transitory computer-readable medium of any of Examples #1-3, further comprising program code that is executable by the processor for causing the processor to: deploy a plurality of container clones concurrently to one another using the runtime data stored in the memory region, without reloading the runtime data from the container snapshot into additional memory regions assigned to the plurality of container clones.

Example #5: The non-transitory computer-readable medium of any of Examples #1-4, further comprising program code that is executable by the processor for causing the processor to: deploy the container with the software service in a computing environment; determine that the software service is in a ready state within the container for performing a client task; subsequent to determining that the software service is in the ready state, generate the container snapshot that includes the runtime data for the software service in the ready state.

Example #6: The non-transitory computer-readable medium of Example #5, wherein the prior point in time is subsequent to the container completing a bootup phase and the software service entering the ready state, and prior to the software service being used to perform any client tasks.

Example #7: The non-transitory computer-readable medium of any of Examples #5-6, further comprising program code that is executable by the processor for causing the processor to: prior to generating the container snapshot, access a file indicating a portion of the runtime data for the software service that is to be excluded from the container snapshot; and exclude the portion from the container snapshot when generating the container snapshot.

Example #8: The non-transitory computer-readable medium of Example #7, wherein the file is an image file configured for deploying the container in one or more computing environments, and wherein the image file includes metadata indicating the portion of the runtime data that is to be excluded from the container snapshot.

Example #9: A method comprising receiving a container snapshot including runtime data for a software service executed inside a container at a prior point in time; deploying a template container from the container snapshot at least in part by assigning a memory region to the template container and loading the runtime data from container snapshot into the memory region; freezing the template container to prevent modification of the runtime data in the memory region; and while the template container is frozen, deploying a container clone using the runtime data in the memory region such that the container clone includes the software service in at least a substantially ready state by default based on the runtime data. Some or all of the method can be implemented by a processor.

Example #10: The method of Example #9, wherein the container clone is configured to use the memory region as an immutable layer from which to retrieve the runtime data, and wherein the container clone is configured to store other data in a writeable layer that is separate from the immutable layer and private to the container clone.

Example #11: The method of any of Examples #9-10, wherein the memory region is a first memory region, and wherein deploying the container clone comprises: assigning a second memory region to the container clone for use in storing data generated by the software service during a runtime of the container clone; and configuring the container clone using the runtime data stored in the first memory region, without reloading the runtime data from the container snapshot into the second memory region.

Example #12: The method of any of Examples #9-11, further comprising deploying a plurality of container clones concurrently to one another using the runtime data stored in the memory region, without reloading the runtime data from the container snapshot into additional memory regions assigned to the plurality of container clones.

Example #13: The method of any of Examples #9-12, further comprising: deploying the container with the software service in a computing environment; determining that the software service is in a ready state within the container for performing a client task; subsequent to determining that the software service is in the ready state, generating the container snapshot that includes the runtime data for the software service in the ready state.

Example #14: The method of Example #13, wherein the prior point in time is subsequent to the container completing a bootup phase and the software service entering the ready state, and prior to the software service being used to perform any client tasks.

Example #15: The method of any of Examples #13-14, further comprising: prior to generating the container snapshot, accessing a file indicating a portion of the runtime data for the software service that is to be excluded from the container snapshot; and excluding the portion from the container snapshot when generating the container snapshot.

Example #16: The method of Example #15, wherein the file is an image file configured for deploying the container in one or more computing environments, and wherein the image file includes metadata indicating the portion of the runtime data that is to be excluded from the container snapshot.

Example #17: A system comprising: a processor; and a memory including instructions that are executable by the processor for causing the processor to: receive a container snapshot including runtime data for a software service executed inside a container at a prior point in time; deploy a template container from the container snapshot at least in part by assigning a memory region to the template container and loading the runtime data from container snapshot into the memory region; freeze the template container to prevent modification of the runtime data in the memory region; and while the template container is frozen, deploy a container clone using the runtime data in the memory region such that the container clone includes the software service in at least a substantially ready state by default based on the runtime data.

Example #18: The system of Example #17, wherein the container clone is configured to use the memory region as an immutable layer from which to retrieve the runtime data, and wherein the container clone is configured to store other data in a writeable layer that is separate from the immutable layer and private to the container clone.

Example #19: The system of any of Examples #17-18, wherein the memory region is a first memory region, and wherein the memory further includes instructions executable by the processor for causing the processor to deploy the container clone at least in part by: assigning a second memory region to the container clone for use in storing data generated by the software service during a runtime of the container clone; and configuring the container clone using the runtime data stored in the first memory region, without reloading the runtime data from the container snapshot into the second memory region.

Example #20: The system of any of Examples #17-19, wherein the memory further includes instructions executable by the processor for causing the processor to: deploy a plurality of container clones concurrently to one another using the runtime data stored in the memory region, without reloading the runtime data from the container snapshot into additional memory regions assigned to the plurality of container clones.

Example #21: A non-transitory computer-readable medium comprising program code that is executable by a processor for causing the processor to: deploy a container that includes a software service in a computing environment; determine that the software service is in a ready state within the container for performing a client task; subsequent to determining that the software service is in the ready state, generate a container snapshot that includes runtime data for the software service in the ready state; and provide the container snapshot for use in deploying container clones in which the software service is in at least a substantially ready state by default using the runtime data.

Example #22: The non-transitory computer-readable medium of Example #21, further comprising program code that is executable by the processor for causing the processor to generate the container snapshot at a particular point in time that is subsequent to the container completing a bootup phase and prior to the software service being used to perform any client tasks.

Example #23: The non-transitory computer-readable medium of any of Examples #21-22, further comprising program code that is executable by the processor for causing the processor to: prior to generating the container snapshot, access a file indicating a portion of the runtime data for the software service that is to be excluded from the container snapshot; and exclude the portion from the container snapshot when generating the container snapshot.

Example #24: The non-transitory computer-readable medium of Example #23, wherein the file is an image file configured for deploying the container in one or more computing environments.

Example #25: A method comprising: deploying, by a processor, a container that includes a software service in a computing environment; determining, by the processor, that the software service is in a ready state within the container for performing a client task; subsequent to determining that the software service is in the ready state, generating, by the processor, a container snapshot that includes runtime data for the software service in the ready state; and providing, by the processor, the container snapshot for use in deploying container clones in which the software service is in at least a substantially ready state by default using the runtime data.

Example #26: The method of Example #25, further comprising generating the container snapshot at a particular point in time that is subsequent to the container completing a bootup phase and prior to the software service being used to perform any client tasks.

Example #27: The method of any of Examples #25-26, further comprising: prior to generating the container snapshot, accessing a file indicating a portion of the runtime data for the software service that is to be excluded from the container snapshot; and excluding the portion from the container snapshot when generating the container snapshot.

Example #28: The method of Example #27, wherein the file is an image file used to deploy the container in the computing environment, and wherein the image file includes metadata indicating the portion of the runtime data that is to be excluded from the container snapshot.

Example #29: A non-transitory computer-readable medium comprising program code that is executable by a processor for causing the processor to: deploy a container in a computing environment, wherein deploying the container involves assigning a memory region to the container; initiate a startup process for a software service inside the container, wherein the startup process involves generating runtime data for the software service and storing the runtime data in the memory region; determine that the startup process is complete for the software service; based on determining that the startup process is complete, freeze the container to prevent modification of the runtime data in the memory region by processes inside the container; and while the container is frozen, deploy a container clone using the runtime data in the memory region such that the container clone includes the software service in at least a substantially ready state by default based on the runtime data.

Example #30: A method, comprising: deploying, by a processor, a container in a computing environment, wherein deploying the container involves assigning a memory region to the container; initiating, by the processor, a startup process for a software service inside the container, wherein the startup process involves generating runtime data for the software service and storing the runtime data in the memory region; determining, by the processor, that the startup process is complete for the software service; based on determining that the startup process is complete, freezing, by the processor, the container to prevent modification of the runtime data in the memory region by processes inside the container; and while the container is frozen, deploying, by the processor, a container clone using the runtime data in the memory region such that the container clone includes the software service in at least a substantially ready state by default based on the runtime data.

Example #31: A system comprising: means for receiving a container snapshot including runtime data for a software service executed inside a container at a prior point in time; means for deploying a template container from the container snapshot at least in part by assigning a memory region to the template container and loading the runtime data from container snapshot into the memory region; means for freezing the template container to prevent modification of the runtime data in the memory region; and means for deploying, while the template container is frozen, a container clone using the runtime data in the memory region such that the container clone includes the software service in at least a substantially ready state by default based on the runtime data.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A non-transitory computer-readable medium comprising program code that is executable by a processor for causing the processor to:

deploy a first container with a first instance of a software service in a computing environment, the first container being usable to generate a container snapshot that includes runtime data for the first instance of the software service;

access a file indicating a portion of the runtime data for the first instance of the software service that is to be excluded from the container snapshot;

determine that the first instance of the software service is in a ready state within the first container;

subsequent to determining that the first instance of the software service is in the ready state, generate the container snapshot of the first instance of the software service in the ready state, wherein generating the container snapshot involves storing a subset of the runtime data that excludes the portion of the runtime data in the container snapshot based on the file;

after generating the container snapshot, deploy a template container from the container snapshot, wherein the template container is a second container, and wherein deploying the template container involves performing a bootup phase for the template container, and wherein the bootup phase involves assigning a memory region to the template container and loading the subset of the runtime data from container snapshot into the memory region;

freeze the template container to prevent modification of the subset of the runtime data in the memory region; and while the template container is frozen, deploy a container clone using the subset of the runtime data in the memory region assigned to the template container, such that the container clone is a third container that includes a second instance of the software service in at least a substantially ready state by default based on the subset of the runtime data.

2. The non-transitory computer-readable medium of claim 1, wherein the container clone is configured to use the memory region as an immutable layer from which to retrieve the subset of the runtime data, and wherein the container clone is configured to store other data in a writeable layer that is separate from the immutable layer and private to the container clone.

3. The non-transitory computer-readable medium of claim 1, wherein the memory region is a first memory region, and further comprising program code that is executable by the processor for causing the processor to deploy the container clone at least in part by:

assigning a second memory region to the container clone for use in storing data generated by the second instance of the software service during a runtime of the container clone; and configuring the container clone using the subset of the runtime data stored in the first memory region, without reloading the subset of the runtime data from the container snapshot into the second memory region.

4. The non-transitory computer-readable medium of claim 1, further comprising program code that is executable by the processor for causing the processor to:

deploy a plurality of container clones concurrently to one another using the subset of the runtime data stored in the memory region, without reloading the subset of the runtime data from the container snapshot into additional memory regions assigned to the plurality of container clones.

5. The non-transitory computer-readable medium of claim 1, wherein the container snapshot is generated at a point in time that is subsequent to the first container completing a bootup phase and the first instance of the software service entering the ready state, and prior to the first instance of the software service being used to perform any client tasks.

6. The non-transitory computer-readable medium of claim 1, wherein the file is an image file configured for deploying the first container in one or more computing environments, and wherein the image file includes metadata indicating the portion of the runtime data that is to be excluded from the container snapshot.

7. A method comprising:

deploying a first container with a first instance of a software service in a computing environment, the first container being usable to generate a container snapshot that includes runtime data for the first instance of the software service;

accessing a file indicating a portion of the runtime data for the first instance of the software service that is to be excluded from the container snapshot;

determining that the first instance of the software service is in a ready state within the first container;

subsequent to determining that the first instance of the software service is in the ready state, generating the container snapshot of the first instance of the software service in the ready state, wherein generating the container snapshot involves storing a subset of the runtime data that excludes the portion of the runtime data in the container snapshot based on the file;

after generating the container snapshot, deploying, by a processor, a template container from the container snapshot, wherein the template container is a second container, and wherein deploying the template container involves performing a bootup phase for the template container, and wherein the bootup phase involves assigning a memory region to the template container and loading the subset of the runtime data from container snapshot into the memory region;

freezing, by the processor, the template container to prevent modification of the subset of the runtime data in the memory region; and while the template container is frozen, deploying, by the processor, a container clone using the subset of the runtime data in the memory region assigned to the template container, such that the container clone is a third container that includes a second instance of the software service in at least a substantially ready state by default based on the subset of the runtime data.

8. The method of claim 7, wherein the container clone is configured to use the memory region as an immutable layer from which to retrieve the subset of the runtime data, and wherein the container clone is configured to store other data in a writeable layer that is separate from the immutable layer and private to the container clone.

9. The method of claim 7, wherein the memory region is a first memory region, and wherein deploying the container clone comprises:

assigning a second memory region to the container clone for use in storing data generated by the second instance of the software service during a runtime of the container clone; and configuring the container clone using the subset of the runtime data stored in the first memory region, without reloading the subset of the runtime data from the container snapshot into the second memory region.

10. The method of claim 7, further comprising deploying a plurality of container clones concurrently to one another using the subset of the runtime data stored in the memory region, without reloading the subset of the runtime data from the container snapshot into additional memory regions assigned to the plurality of container clones.

11. The method of claim 7, wherein the container snapshot is generated at a point in time that is subsequent to the first container completing a bootup phase and the first instance of the software service entering the ready state, and prior to the first instance of the software service being used to perform any client tasks.

12. The method of claim 7, wherein the file is an image file configured for deploying the first container in one or more computing environments, and wherein the image file includes metadata indicating the portion of the runtime data that is to be excluded from the container snapshot.

13. A system comprising:
a processor; and
a memory including instructions that are executable by the processor for causing the processor to:
   deploy a first container with a first instance of a software service in a computing environment, the first container being usable to generate a container snapshot that includes runtime data for the first instance of the software service;
   access a file indicating a portion of the runtime data for the first instance of the software service that is to be excluded from the container snapshot;
   determine that the first instance of the software service is in a ready state within the first container;
   subsequent to determining that the first instance of the software service is in the ready state, generate the container snapshot of the first instance of the software service in the ready state, wherein generating the container snapshot involves storing a subset of the runtime data that excludes the portion of the runtime data in the container snapshot based on the file;
   after generating the container snapshot, deploy a template container from the container snapshot, wherein the template container is a second container, and wherein deploying the template container involves performing a bootup phase for the template container, and wherein the bootup phase involves assigning a memory region to the template container and loading the subset of the runtime data from container snapshot into the memory region;
   freeze the template container to prevent modification of the subset of the runtime data in the memory region; and
   while the template container is frozen, deploy a container clone using the subset of the runtime data in the memory region assigned to the template container, such that the container clone is a third container that includes a second instance of the software service in at least a substantially ready state by default based on the subset of the runtime data.

14. The system of claim 13, wherein the container clone is configured to use the memory region as an immutable layer from which to retrieve the subset of the runtime data, and wherein the container clone is configured to store other data in a writeable layer that is separate from the immutable layer and private to the container clone.

15. The system of claim 13, wherein the memory region is a first memory region, and wherein the memory further includes instructions executable by the processor for causing the processor to deploy the container clone at least in part by:
   assigning a second memory region to the container clone for use in storing data generated by the second instance of the software service during a runtime of the container clone; and
   configuring the container clone using the subset of the runtime data stored in the first memory region, without reloading the subset of the runtime data from the container snapshot into the second memory region.

16. The non-transitory computer-readable medium of claim 1, wherein the template container includes a running process prior to the freezing.

\* \* \* \* \*